(12) United States Patent
Liberatore

(10) Patent No.: US 8,852,661 B2
(45) Date of Patent: Oct. 7, 2014

(54) METHOD AND MACHINE FOR CONTINUOUS COATING OF CORES OF PRODUCTS, IN PARTICULAR, CONFECTIONARY PRODUCTS

(75) Inventor: Mauro Liberatore, Rome (IT)

(73) Assignee: Soremartec S.A., Arlon (BE)

( * ) Notice: Subject to any disclaimer, the term of this patent is extended or adjusted under 35 U.S.C. 154(b) by 253 days.

(21) Appl. No.: 13/141,978

(22) PCT Filed: Dec. 23, 2009

(86) PCT No.: PCT/IB2009/007880
§ 371 (c)(1),
(2), (4) Date: Oct. 7, 2011

(87) PCT Pub. No.: WO2010/073112
PCT Pub. Date: Jul. 1, 2010

(65) Prior Publication Data
US 2012/0015085 A1    Jan. 19, 2012

(30) Foreign Application Priority Data
Dec. 24, 2008    (IT) .............................. TO2008A0990

(51) Int. Cl.
*A23G 3/26*    (2006.01)
*A23G 3/34*    (2006.01)
*A23G 9/24*    (2006.01)

(52) U.S. Cl.
CPC ............... *A23G 3/26* (2013.01); *A23G 3/0095* (2013.01); *A23G 9/245* (2013.01)
USPC .......................................... 426/302; 426/304

(58) Field of Classification Search
CPC ........ A23G 3/26; A23G 3/0095; A23G 9/245
USPC .......................................... 426/302, 289, 304
See application file for complete search history.

(56) References Cited

U.S. PATENT DOCUMENTS

| | | | |
|---|---|---|---|
| 3,911,860 A * | 10/1975 | Nohynek | 118/695 |
| 4,064,831 A | 12/1977 | Okawara | |
| 4,674,198 A | 6/1987 | Hüttlin | |
| 2007/0275163 A1 | 11/2007 | Dunaitschik et al. | |
| 2009/0220676 A1* | 9/2009 | Koerblein | 427/2.14 |

FOREIGN PATENT DOCUMENTS

| | | |
|---|---|---|
| CN | 101193710 A | 6/2008 |
| EP | 0 504 773 A1 | 9/1992 |
| EP | 0 610 840 A2 | 8/1994 |
| EP | 0 648 529 A1 | 4/1995 |
| EP | 1 508 278 A1 | 2/2005 |

* cited by examiner

*Primary Examiner* — Jyoti Chawla
(74) *Attorney, Agent, or Firm* — Dickstein Shapiro LLP

(57) ABSTRACT

A method and a machine for continuous coating of cores of products, in particular confectionery products, in which a hollow drum rotating about an axis of its own carries, stably connected inside it, a body wound axially in a helix or a spiral, with which it delimits a plurality of treatment chambers, each adapted to house a mass of cores to be treated; in at least part of the chambers, the mass of cores is sprayed with a coating material during rotation of the drum in a first direction of rotation about its axis, and impinged upon by a flow of process air during rotation of the drum in a second direction of rotation opposite to the first direction of rotation, before feeding the coated cores into an adjacent chamber causing the drum to perform a complete rotation in one of the two directions of rotation.

11 Claims, 9 Drawing Sheets

METHOD AND MACHINE FOR CONTINUOUS COATING OF CORES OF PRODUCTS, IN PARTICULAR, CONFECTIONARY PRODUCTS

TECHNICAL FIELD

The present invention relates to a method for continuous coating of cores of products, in particular confectionery products, to which the ensuing treatment will make explicit reference, without this implying any loss in generality.

BACKGROUND ART

In the confectionery industry, it is known to produce products that comprise an internal core and one or more layers of coating of the core itself obtained with different products. In particular, there exists in the confectionery industry the need to coat particularly frail cores, such as for example those that form the internal part of the products Rocher® or Raffaello® produced by the present applicant, which are generally constituted by two half-shells of wafers set facing one another and filled with cream. The coating of the shells is normally constituted by a first layer of chocolate and by a second layer of sugary syrup. Both of the layers are obtained by spraying and subsequent solidification or evaporation of the materials sprayed. To render the coating possible it is necessary for the cores that are to be coated and/or the intermediate products that are being coating to be kept in rotation in such a way that, during the movement of rotation and revolution, a desired amount of coating product will be deposited and uniformly distributed over the outer surface of each individual core or intermediate product. Coating with sugary syrups requires that each operation of spraying of sugary syrup will be followed by a step of rest and then a step of drying and/or desiccation. Desiccation is performed by directing onto the intermediate product, partially or completely coated, a flow of air that, when removed, carries along with it the moisture of the sugary syrup, causing it to evaporate. The operations described above, repeated a number of times, enable formation on the cores of coatings of different thicknesses.

For the operations of coating described above, it is known to use single coating machines operating on batches, said machines being known by the term "rotary coating pans", which entail, however, long machine down times for loading/unloading and washing, or else coating machines operating continuously, for example of the type described in the U.S. patent application No. US2007/0275163A1. Said machines comprise a motor-driven hollow drum, which can rotate in a direction of rotation about a longitudinal axis of its own and houses a motor-driven body wound in a helix or spiral, coupled in a fluid-tight way to the inner surface of the drum. During coating, the drum is rotated whilst the spiral body is kept fixed within the drum for a pre-set period for delimiting, together with the drum, a succession of chambers for treatment of the cores.

The spiral body is, instead, rotated with respect to the hollow drum and independently of the hollow drum itself by a dedicated electric motor of its own to displace the cores axially towards an outlet of the drum and in succession between one chamber and the adjacent one.

In known machines of the type described above, in at least part of the chambers, a delivery nozzle is provided for spraying the material used for coating the cores, and a blower head for delivering a drying air flow for drying the sprayed coating material.

Known machines of the type described above, albeit used, are far from satisfactory from a functional standpoint above all for the reason that the combination of the rotation of the drum in a pre-set direction of rotation and of the independent rotation of the spiral body determines, during the coating process, a high degree of rubbing of the cores against one another and against the internal surfaces of the drum and of the spiral body, with the consequence that, even after relatively short periods of treatment, there is a progressive abrasion of the cores themselves with the undesirable formation of crumbs and powder. The formation of crumbs and powder is then all the more accentuated, the more friable and delicate are the cores.

In addition, in known machines of the type described above, as a result of the rotation in a single direction of the drum, the mass of cores contained in each of the chambers sets itself in a position inclined with respect to a horizontal plane and remains in said position for the entire duration of the treatment of the cores present in the chamber itself. The inclined arrangement of the mass of cores imposes arrangement of the delivery nozzle and of the blower head within the chamber itself, in a given position, in order for said equipment not to be buried in, or interfere with, the mass itself. The positions so far envisaged, within the drum, for the delivery nozzle and for the blower head, are not, however, yet functionally optimal. In fact, the current relative positioning, which is conditioned by the shortage of space available inside the coating drum, means that, during coating, part of the coating syrup sprayed by the delivery nozzle, inevitably hits the blower head, dirtying it to the point of modifying the distribution and direction of the flow of air delivered, with the result that the drying is no longer homogeneous.

Furthermore, once again during coating, part of the flow of air fed by the blower head intersects the jet of coating syrup, perturbing it and consequently rendering adjustment and setting-up of the spraying system problematical.

Finally, in known machines it is not possible or at least it is extremely problematical to vary the thermodynamic conditions within each of the chambers arbitrarily, and this prevents execution of a number of drying steps; i.e., it prevents variation of the characteristics of the air as the characteristics of the coating materials vary.

Finally, known machines are relatively complex from the constructional standpoint, require strict machining tolerances and high structural undeformability, it being necessary always to ensure the tightness between the outer casing and the spiral body whatever the size of the product to be treated, while cleaning thereof is extremely laborious and, in any case, subordinate to removal of the helical body from inside the drum, which involves anything but negligible difficulties.

DISCLOSURE OF INVENTION

The aim of the present invention is to provide a method and a machine for continuous coating of cores, in particular confectionery products, which will enable the problems set forth above to be solved in a simple and economically advantageous way.

Provided according to the present invention is a method for continuous coating of cores of products, in particular confectionery products, in a coating machine comprising at least one hollow drum rotating about a hinge axis of its own and having a plurality of internal treatment chambers that communicate with one another and are each adapted to house a respective mass of cores to be treated, the method comprising the steps of feeding the mass of cores to be treated and at least one coating material into one of said chambers and of coating said cores with said coating material, handling them within said chamber, said method being characterized in that the handling of said cores within said chamber comprises a step of angularly and cyclically oscillating said drum in opposite directions about said hinge axis, maintaining the mass to be treated in said treatment chamber.

Preferably, in the method defined above, said angular and cyclic oscillation in opposite directions is performed so as to displace and set cyclically said mass to be treated in two different reciprocally facing angled positions, substantially symmetrical with respect to a vertical plane passing through the hinge axis of the drum.

The present invention moreover regards a machine for continuous coating of cores, in particular for confectionery products.

Provided according to the present invention is a machine for continuous coating of cores of products, in particular confectionery products, the machine comprising: at least one hollow drum having a hinge axis of its own and having a plurality of internal treatment chambers communicating with one another; a motor for driving said drum for rotating said drum about said axis; first feeding means for feeding a mass of said cores to be treated into one of said chambers; and second feeding means for feeding at least one material for coating said cores into said chamber, said machine being characterized in that it further comprises a body wound in a helix and set within said drum and stably fixed to said drum for delimiting with the drum said chambers, and in that a command and control unit of said motor is provided for rotating said drum with angular and cyclic oscillating motion in opposite directions about said hinge axis, maintaining the mass to be treated in said treatment chamber.

Preferably, the machine defined above further comprises third conveying means for feeding a mass of air common to all of said chambers into said drum, blowing means for generating a respective drying air flow in each of said chambers, and variation means for varying, for each of said chambers, the characteristics of the respective said drying air flow.

BRIEF DESCRIPTION OF THE DRAWINGS

The invention will now be described with reference to the annexed figures, which illustrate a non-limiting example of embodiment thereof and in which.

BEST MODE FOR CARRYING OUT THE INVENTION

Figure 1:
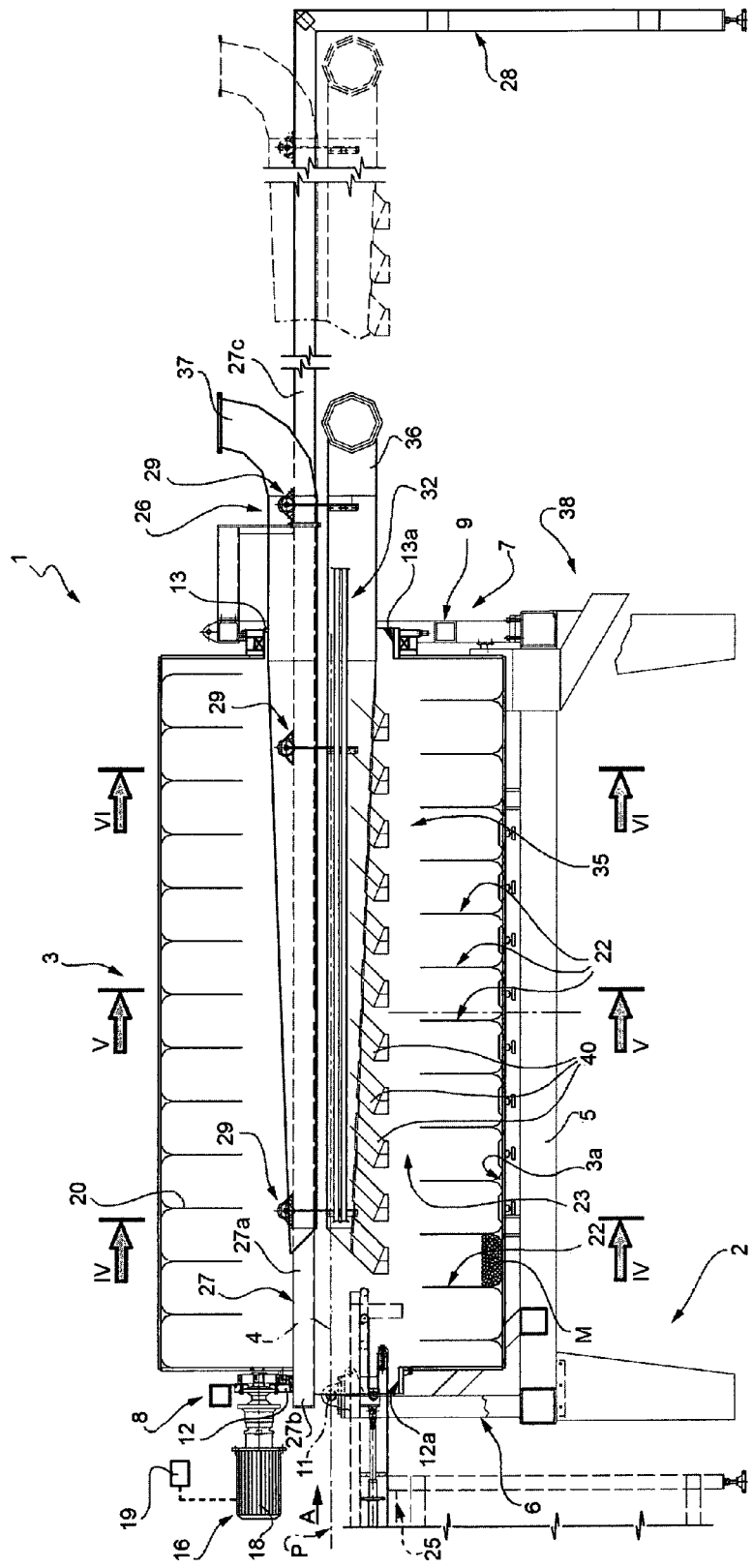
FIG. 1 is a schematic and cross-sectional illustration of a preferred embodiment of a machine for continuous coating of cores of products, in particular confectionery products, built according to the teachings of the present invention.
Figure 2:
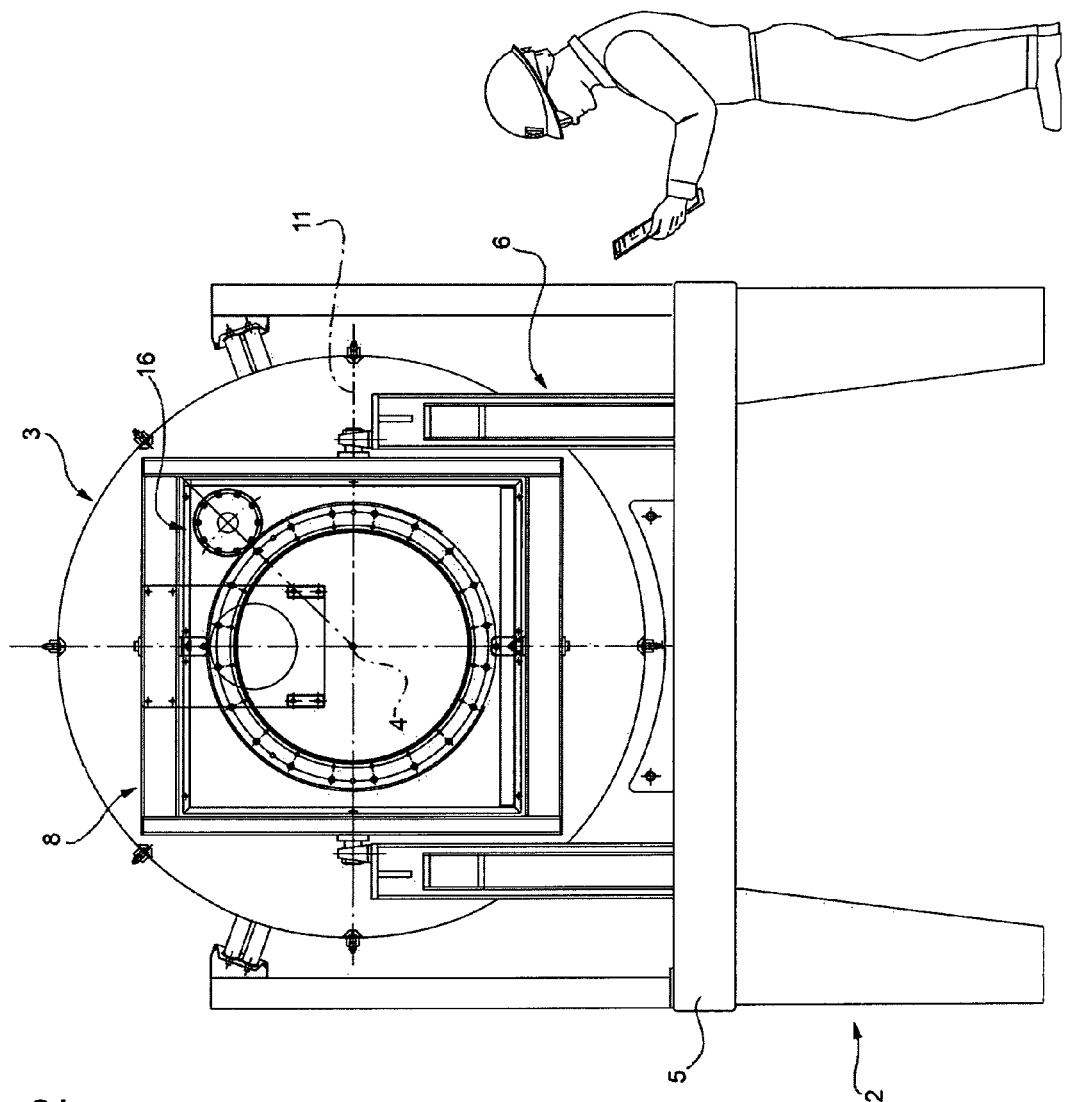
FIGS. 2 and 3 are opposite front views of the machine of FIG. 1 with parts removed for reasons of clarity.

In FIG. 1, designated as a whole by 1, is a machine for continuous coating of cores of products, in particular, confectionery products. The machine 1 comprises a supporting structure 2 and an overlying hollow drum 3 having a substantially horizontal axis 4 of its own. The supporting structure 2 comprises a fixed base 5 and two pairs 6 and 7 of uprights extending upwards from the base 5 and set on opposite axial sides of the drum 3. Associated to each pair 6, 7 of uprights is a respective structural ring 8, 9, which in the case in point is quadrangular. The ring 8 is hinged to the uprights 6 so as to tilt about a substantially horizontal hinge axis 11 orthogonal to the axis 4 and intersected by the axis 4 itself, whilst the ring 9 is fixedly connected to the uprights 7.

Figure 3:
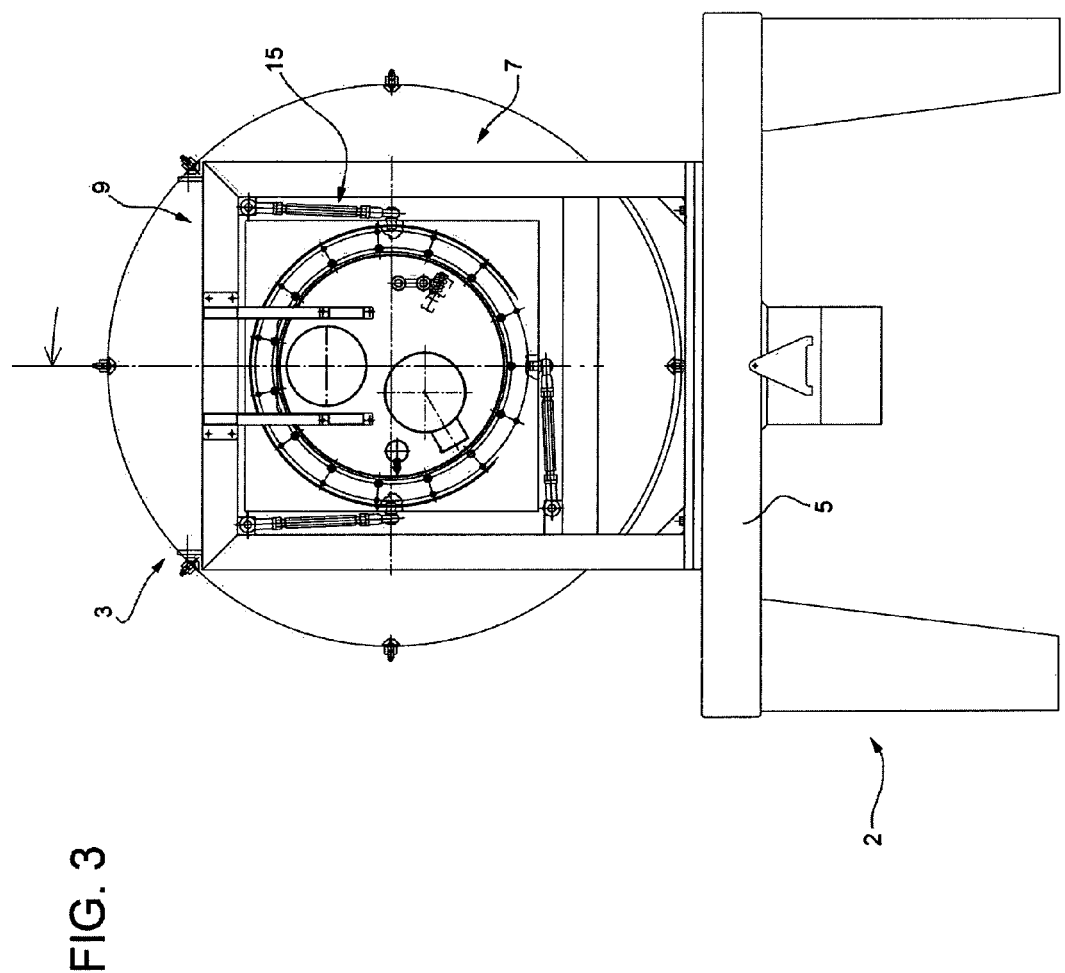

The drum 3 has two terminal attachment collars 12 and 13 opposed to one another and sharing the same axis 4, of which the collar 12 is coupled to the ring 8 via a corresponding thrust bearing fixedly connected to the ring 8 itself, whilst the collar 13 is coupled to the ring 9 by a corresponding thrust bearing, the position of which with respect to the ring 9 is adjustable via a set 15 of jacks set between the ring 9 and the corresponding thrust bearing (FIG. 3). The set 15 of jacks enables, in particular, variation of the inclination of the axis 4 of the drum 3 with respect to a horizontal plane about the hinge axis 11.

The drum 3 is able to rotate about the axis 4 under the thrust of a motion-reducer assembly 16 carried by the ring 8 and angularly connected to the corresponding thrust bearing via a transmission, conveniently of the gear type. The motion-reducer assembly 16 comprises an electric motor 18, which is controlled by a command and control unit 19 for rotating the drum 3 about the axis 4 in a reciprocating or continuous way, as will be better described in what follows.

Once again with reference to FIG. 1, the drum 3 houses inside it an annular or axially hollow body 20, which is wound axially in a helix or spiral, is set in contact with the inner surface 3a of the drum 3, and is fixedly connected to the drum 3 itself for delimiting, together with the inner surface 3a, a plurality of annular chambers 22. The chambers 22 communicate with one another through a central duct 23 that shares the axis 4 and, in turn, communicates with the outside through the axial openings 12a and 13a delimited, respectively, by the collars 12 and 13.

Extending through the opening 12a is a belt conveyor 25, in itself known and not described in detail, for feeding a mass M of cores to be treated into one of the chambers 22. Extending through the opening 13a, instead, within the drum 3 is a delivery assembly 26 for feeding into each of the chambers 22 the materials envisaged for coating the cores to be treated, a mass of drying air or process air for drying the coating materials when they are deposited on the cores, and a fluid for flushing the drum 3.

Figure 4:
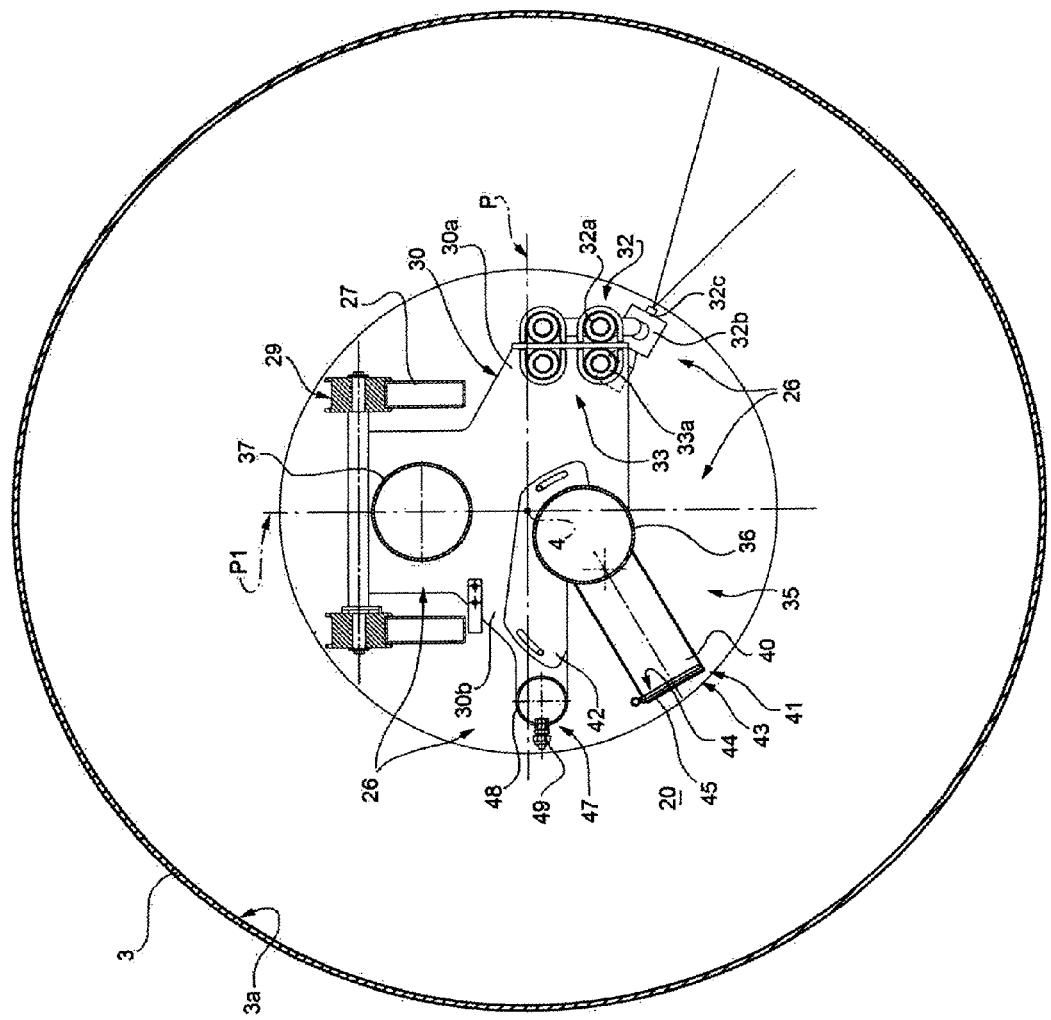
FIGS. 4, 5 and 6 are cross sections, at an enlarged scale and with parts removed for reasons of clarity according to the lines IV-IV, V-V and VI-VI, respectively.
Figure 6:
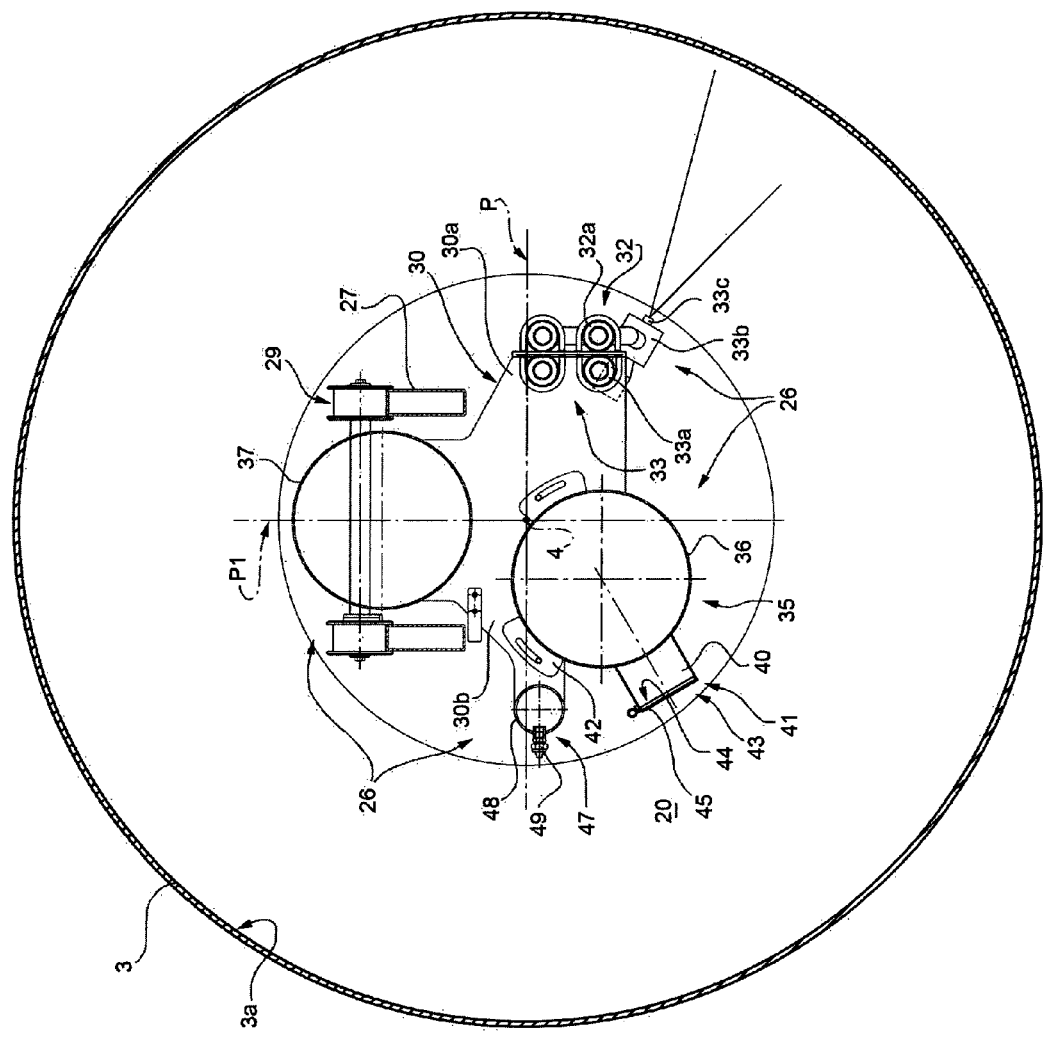

The delivery assembly 26 comprises a guide rail 27 having an intermediate stretch 27a, which extends within the drum 3 above and parallel to a horizontal plane P passing through the axis 4, and two opposite terminal stretches 27b and 27c, which project axially on the outside of the drum 3 and are connected, the first to the structural ring 8 and the second to a supporting upright 28 that stands on the floor. Coupled to the rail 27 are three carriages 29, each of which supports a suspended frame 30 of its own, which is shaped substantially like a T set upside down with two opposed horizontal arms 30a and 30b (FIGS. 4 and 6).

The assembly 26 further comprises two delivery devices, designated by 32 and 33 for feeding, in the case in point, the first a chocolate-based coating material or other coating material and the second a coating material with a base of sugary syrup. Each device 32, 33 in turn comprises a corresponding feed pipe 32a and 33a connected to the ends of the horizontal arms 30a and, for at least part of the chambers 22, a corresponding delivery head 32b, 33b, in itself known and not described in detail, coupled to the respective pipe 32a, 33a in an adjustable way at the inlet of the corresponding chamber 22. Each delivery head 32b and 33b has at least one respective delivery nozzle 32c, 33c set below the plane P and in an inlet of the corresponding chamber 22 for spraying the material received from the respective pipe 32a, 33a towards the inner surface 3a of the drum 3 and, in use, onto the mass M of material treated in the chamber 22 itself.

The assembly 26 then comprises a device 35 for drying the sprayed coating materials; the device 35 comprises a common duct 36 for introduction of a mass of air common to all the chambers 22 and a duct 37 for extraction of the air present in the drum 3, both of which are stably connected to the aforesaid frames 30 and both of which present respective stretches set within the drum 3 itself having a section that increases towards an outlet 38 of the drum 3.

Figure 5:
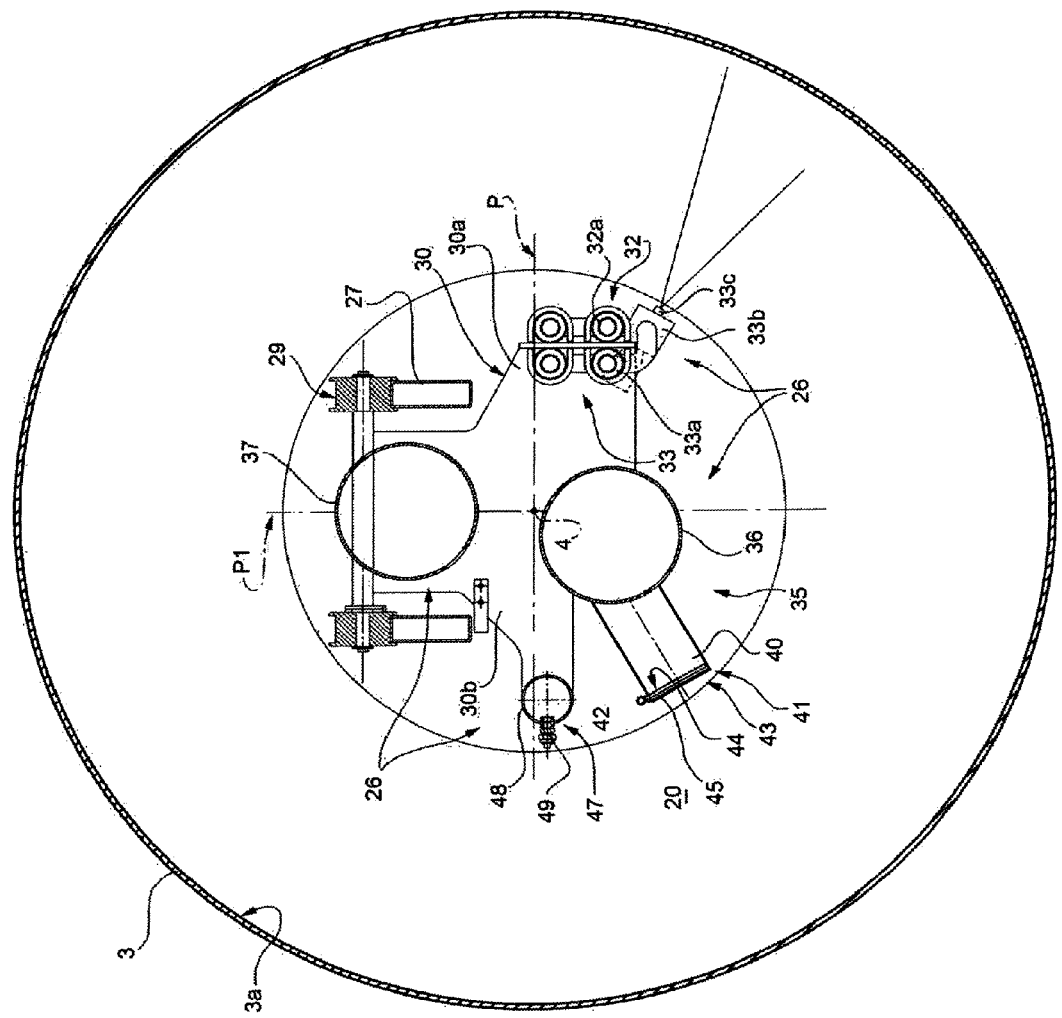

In greater detail, the extraction duct 37 extends in a raised position substantially along the rail 27, whilst the duct 36 for introduction of the air is set in a lowered position with respect to the extraction duct 37 and is connected to the arms 30b substantially at the same height as, but in a position set laterally at a distance from, the ducts 32a, 33a for feeding the coating materials. For each of the chambers 22, the device 35 then comprises a corresponding delivery duct 40, which has an inlet communicating with the inlet duct 36, and an outlet 41 oriented towards the inner surface 3a of the drum 3 and set once again on the opposite side of the outlets of the nozzles 32c, 33c with respect to a vertical plane P1 passing through the axis 4 of the drum and orthogonal to the plane P, as may be seen in FIGS. 4-6. The ducts 40 are carried by an attachment structure 42 of their own, coupled to the frames 30 in an adjustable way about the axis of the inlet duct 36 so as to enable adjustment of the angular position of the duct 40 itself between two extreme end-of-travel angular positions.

In the proximity of the corresponding outlet 41, each delivery duct 40 carries a conditioning and distribution assembly 43 for forming a dedicated drying air flow directed at the material present in the corresponding chamber 22. In particular, each assembly 43 comprises a respective conditioning device 44 (illustrated schematically), independent of the other conditioning devices 44, for varying the temperature of the drying air introduced into the corresponding chamber 22, and a device 45 for distributing said drying air flow. In the particular example described, the distribution device 45 comprises a perforated partition wall, which can be chosen from among a plurality of partition walls which differ from one another in size, geometry, and distribution of the perforations so as to divide and orient the flow of air directed onto the corresponding mass of cores being coated in different ways.

Finally, the assembly 26 comprises a flushing device 47, which in turn comprises a pipe 48 for inlet of a flushing liquid connected to the arms 30b in a position set alongside the inlet pipe 36 and a plurality of nozzles 49 facing the inner surface 3a and set substantially in the horizontal plane P.

Figure 9:
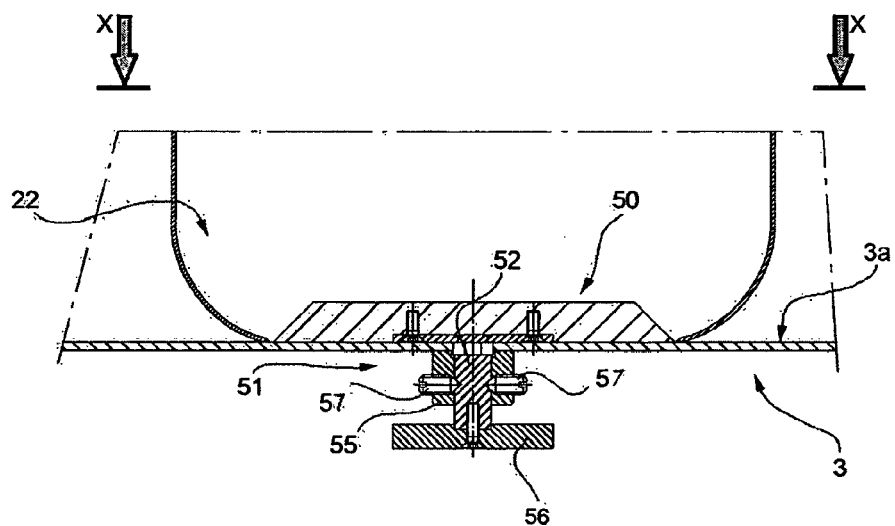
FIG. 9 illustrates, in cross section and at an enlarged scale, a detail of FIG. 1.
Figure 10:
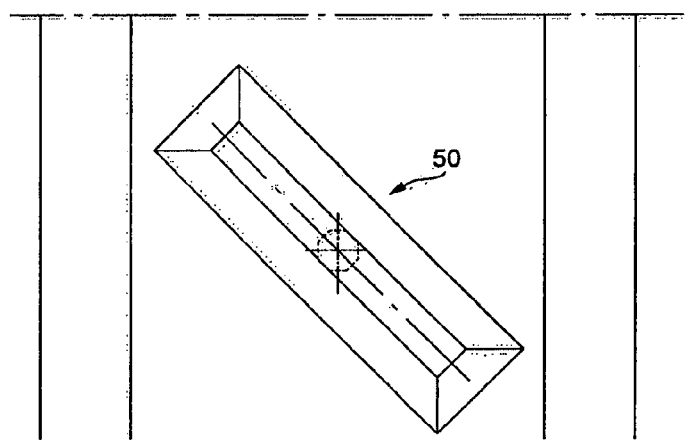
FIG. 10 is a view according to the line X-X of FIG. 9.

With specific reference to FIGS. 9 and 10, housed within each of the chambers 22 is a ring of mixing ploughshares 50, which extend towards the axis 4 starting from the inner surface 3a of the drum 3, to which the ploughshares 50 are coupled in an adjustable way, each, via a respective projecting angular adjustment device 51 that can be actuated from outside the drum 3 independently of the other devices 51. Each device 51 comprises a faceted supporting pin 52, which is hexagonal in the particular example described and one end of which is stably connected to the corresponding ploughshare 50 and extends on the outside of the drum 3 through a corresponding opening and within a sleeve 55 external to the drum 3 itself, and terminates with a handwheel 56 for rotation and positioning of the ploughshare 50. The sleeve 55 has a stretch with a shape complementary to that of the pin 52 for setting and withholding the ploughshare 50 in a plurality of pre-set angular positions according to the number and arrangement of the facets, and carries a pair of radial grubscrews 57 for blocking, in a releasable way, the pin 52 so that it couples with the complementary stretch of the sleeve 55.

Operation of the machine 1 will now be described considering, for simplicity of exposition, a single mass M of cores to be treated and starting from the condition (illustrated in FIG. 1) where the drum 3 is stationary in a zero or resting position thereof, and the mass M or bed of cores to be treated fed by the conveyor is set on the bottom of the second of the chambers 22.

Starting from said condition, maintaining the mass in the aforesaid second chamber 22, the command and control unit 19 of the motor 18, on the basis of a program of displacement/coating stored in a memory block of the unit 19 itself, issues a command to the motor 18 for it to rotate cyclically and for a given period of time the drum 3 first in one direction of rotation, for example in a counterclockwise direction (FIG. 8), through a pre-set angle, conveniently equal to or less than 180°, and then in the opposite direction (clockwise in FIG. 7) by an angle equal or comparable to the previous one. During said reciprocating cyclic rotation of the drum 3, the mass M of cores shifts, arranging itself once again cyclically in two different angled extreme positions that face one another and are set symmetrically on opposite sides of the vertical plane P1, as may be seen in FIGS. 7 and 8. Once again during rotation whether in one direction or in the other, the cores, as a result of the rotation of the drum 3 and of the combined actions of the ploughshares 50 and of the walls delimiting the chamber 22, are continuously mixed and progressively taken in positions facing the delivery heads 32b and 33b and the outlets 41 of the ducts 40.

Figure 7:
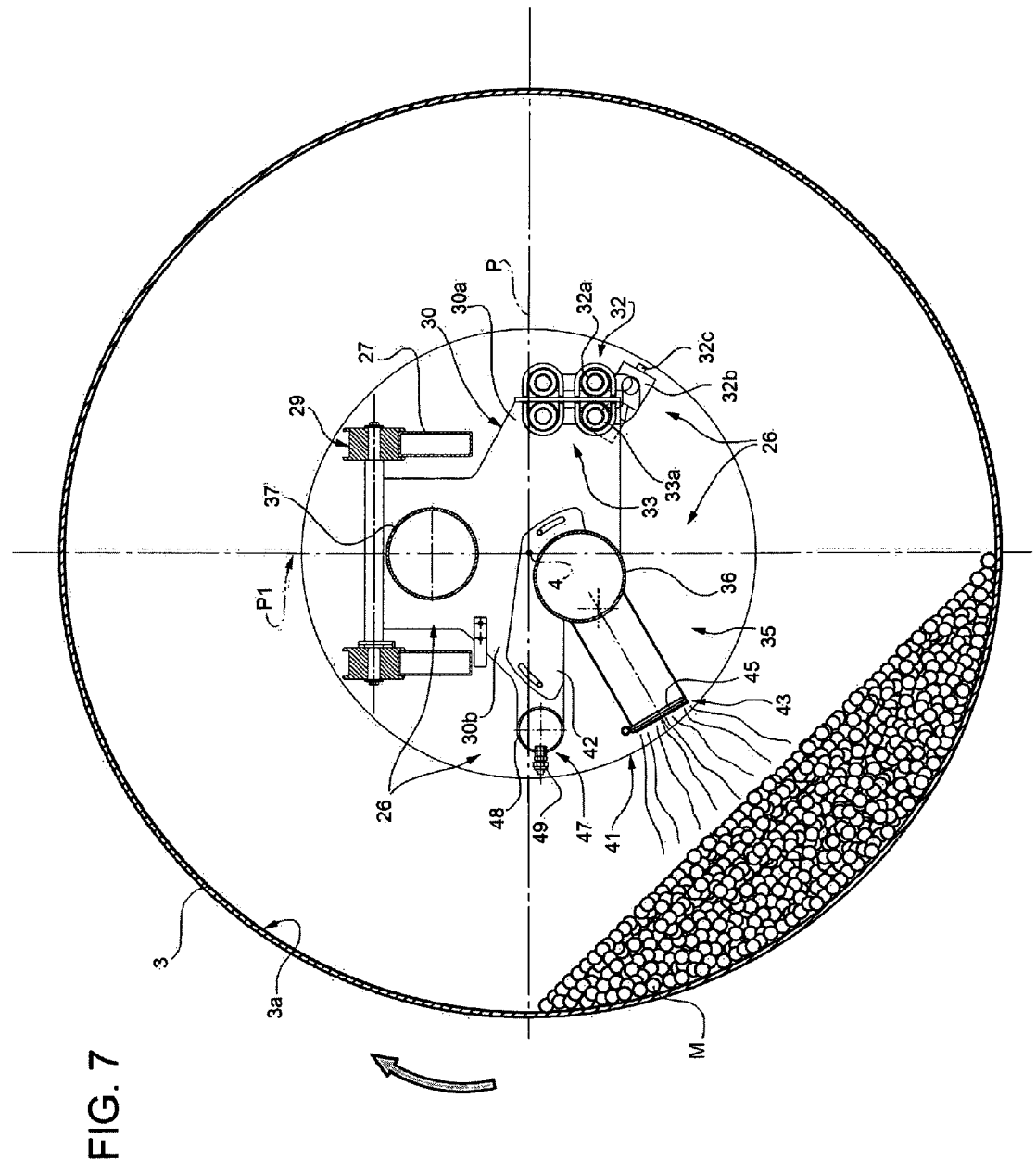
FIGS. 7 and 8 are similar to FIG. 4 and illustrate the machine and the mass of cores treated in two different treatment positions.
Figure 8:
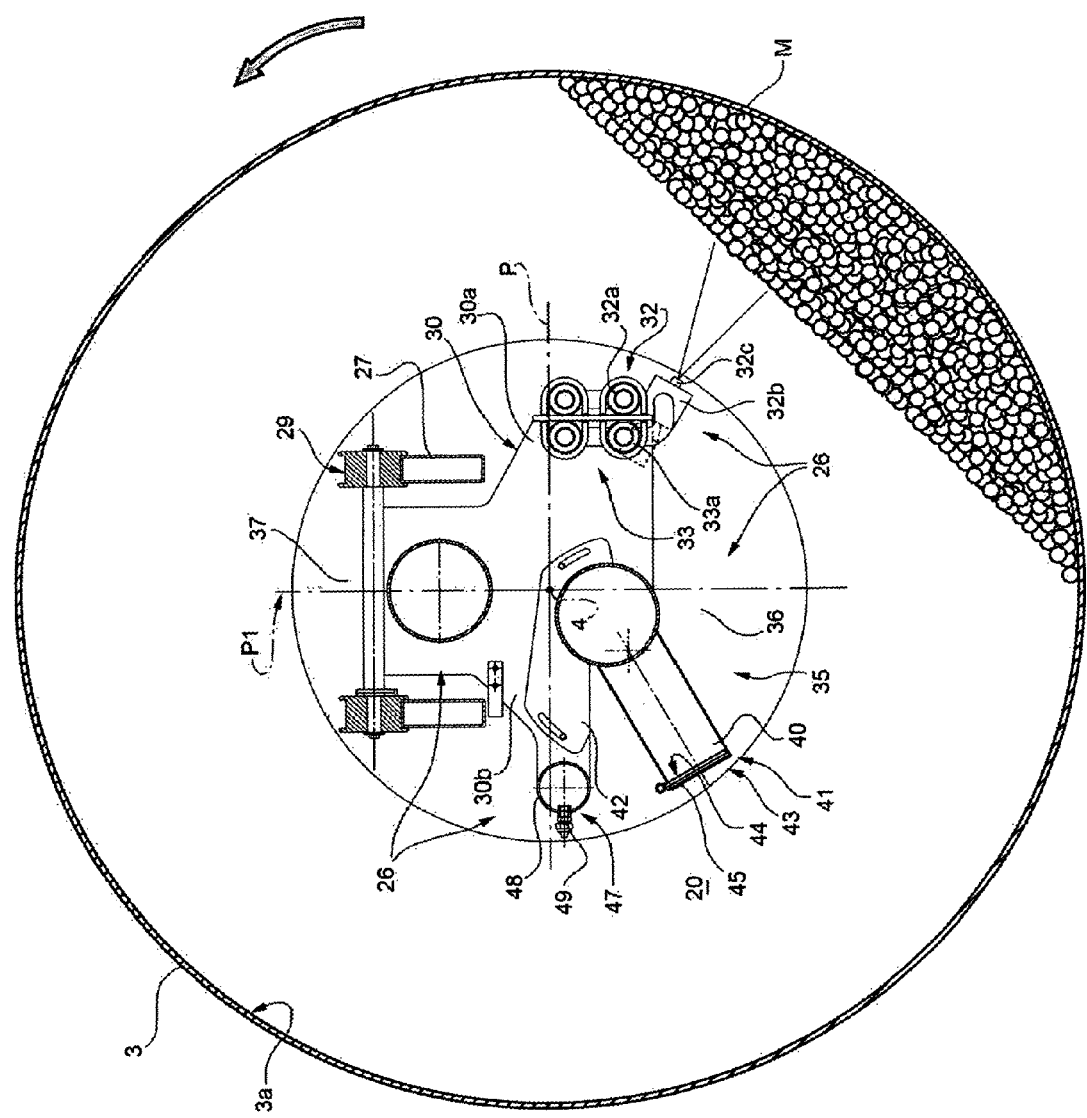

Simultaneously with rotation of the drum 3 in a counterclockwise direction, via the delivery head 32b corresponding to the chamber 22 in which the cores are set the chocolate-based material is sprayed on the cores. Once the angle of rotation set has been reached, the command and control unit 19 acts on the motor 18 and reverses the direction of rotation of the drum 3, causing a mixing of the cores opposite to the first. Mixing in one direction and in the other favours adhesion of the coating material to the cores and formation of a first layer of at least partial coating of the cores. Once the zero or resting position of the drum 3 has been exceeded, the cores coated with the coating material previously sprayed are subjected to the flow of process air previously set both as regards temperature and as regards distribution by acting on the corresponding assembly 43 (FIG. 7). The flow of air fed in impinges upon the cores and causes a progressive solidification and stabilization of the material present on the cores themselves. Since all the cores are continuously mixed, also in this step of clockwise rotation, once again as a result of the combined action of the ploughshares 50 and of the walls delimiting the chamber 22, the solidification and stabilization of the coating material is homogeneous throughout the mass of cores.

The operations of cyclic rotation of the drum 3 in opposite directions, as well as both or just one of the operations of spraying and/or of drying described above are repeated cyclically for a given period of time such that all the coating material fed is finally applied on the cores. According to the material to be coated, the type of the coating material, and the thickness of the layer to be produced on the cores, it may be necessary to carry out the operations of spraying and drying at different times and/or with different flows of drying air or simply keep the partially coated cores in relative motion and in a controlled atmosphere. For this reason, once the treatment is completed in one of the chambers 22, the drum 3 is rotated in just one direction through 360°, and the mass M is fed by one step and displaced into an adjacent chamber 22, where, once again simultaneously with a further step of cyclic oscillation of the drum 3, a further treatment of the cores is performed, as described previously. The alternation of a step of cyclic oscillation with a step of advance by one step continues until a first homogeneous layer of desired thickness is obtained, involving a block or succession of chambers 22 that may vary from one coating process to another.

Regardless of the number of chambers 22 used, once formation of the first layer has been completed, the drum 3 is again rotated in just one direction of rotation by an angle of 360° and the coated cores are displaced by a further step and transferred into an adjacent chamber 22, in which the second coating with the sugary syrup begins. As in the case of coating with the first material, also coating with said second material is performed by alternating one or more steps of cyclic oscillation of the drum 3 with one or more steps of feed by steps of the cores, performing, during one or more steps of cyclic oscillation, an operation of spraying of the second coating material during counterclockwise rotation of the drum 3 and an operation of drying during its clockwise rotation. As in the case of formation of the first layer, also the operation of formation of the second layer can, according to the cases, involve one chamber 22 or a block of adjacent chambers 22.

Whenever a step of the process of coating with sugar is completed, the drum 3 is again rotated in just one direction through 360°, and the coated cores are fed by one step, and so forth until they reach the outlet 38 of the drum 3 and are emptied off the machine.

From practical experimental tests it has been possible to verify that the constructional characteristics of the machine 1 and, in particular, the fact of providing a drum with annular chambers set alongside one another and of rotating the drum 3 itself cyclically in angularly opposite directions for a given period of time before transferring the cores into a subsequent treatment chamber limits, as compared to known solutions, rolling of the cores being treated inside the drum 3 and, consequently, any rubbing of the cores either against the internal surfaces of the drum 3 and of the body 20 or against one another, thus drastically reducing any shattering and undesirable formation of crumbs and powder, whatever the material constituting the cores, including particularly friable ones, and whatever the geometry of the cores themselves.

In addition, the cyclic rotation in opposite directions of the drum 3 during the step of coating enables variation, as compared to known solutions in which the drum rotates in just one direction, of the relative position of the delivery heads 32b and 33b and of the corresponding outlets 41 of the duct for delivery of the drying air, thus preventing the aforesaid interference between the material supplied and the drying air flow. In fact, in the machine 1, during oscillation of the drum 3, the mass of the cores is sequentially set in two distinct positions corresponding to the two different and opposite directions of rotation, and this enables delivery of the coating material and of the drying air flow in two divergent directions substantially opposed to one another. In this way, the coating material does not contaminate the outlets for the drying air, and the drying air itself does not perturb the action of spraying of the coating material, with the result that both of the adjustments are facilitated enormously.

In the machine 1 described, the conditioning and distribution assemblies 43 set on the outlets of each of the delivery ducts 40 enable, in each of the chambers 22, a pre-defined drying air flow to be obtained that is specific for the individual chamber and is independent of the flows of the other chambers 22. In this way, each chamber 22, together with its delivery head 32b, 33b and with its duct 40 for delivery of the air is practically equivalent to a single or independent rotary coating pan.

As regards, instead, the constructional aspect, as compared to known solutions, the machine 1 described is particularly simple, uses a single motor, and above all does not include members, coupled to one another in a fluid-tight way and mobile with respect one another, for delimiting the chambers.

Finally, the machine 1 described is easy to clean and the very angular oscillation in opposite directions of the drum 3 facilitates considerably the cleaning operations, which, on the other hand, do not require any removal of components internal to the drum.

From the foregoing description it emerges clearly how modifications and variations may be made to the machine 1 and to the method described, without thereby departing from the sphere of protection defined by the independent claims.

In particular, the drum 3 could comprise a number of chambers 22 different from the one indicated by way of example, and delivery devices different from the ones indicated. In particular, the machine could comprise a number of delivery devices different from the one indicated in the case where it were sufficient to feed just one coating material or more than two coating materials.

Finally, from the foregoing description it emerges clearly how the machine and the method described can be used for any product and whenever there is the problem of preventing crumbling and in general deterioration, abrasion, or chipping of the products to be coated.

The invention claimed is:

1. A method for the continuous coating of cores of confectionery products, the method comprising:
   providing a coating machine comprising at least one hollow drum rotating about a hinge axis thereof and having a plurality of internal treatment chambers communicating one with the other and adapted to each house a respective mass of cores to be treated;
   feeding the mass of cores to be treated and at least one coating material in one of said chambers;
   coating said cores with said coating material by handling them within said treatment chamber, wherein the handling of said cores within said treatment chamber comprises a step of angularly and cyclically oscillating said drum in opposite directions about said hinge axis maintaining the mass to be treated in said treatment chamber, wherein said angular and cyclic oscillation in opposite directions is carried out so as to cyclically displace and arrange said mass to be treated in two different reciprocally facing angled positions; and
   conveying a coating product towards said mass of cores when the mass is arranged in one of said two angled positions and convey a drying air flow towards said mass of cores when the mass is arranged in the other one of said two positions.

2. The method according to claim 1, wherein said angled positions are substantially symmetrical with respect to a vertical plane passing through said hinge axis.

3. The method according to claim 1, wherein the conveying of said drying air flow comprises the step of feeding in said drum a mass of air common to all of said treatment chambers and a step of varying, for each of said chambers, the features of said mass of air so as to feed in each of said treatment chambers said respective dedicated drying air flow having identical or different features with respect to the drying air flows fed in the other chambers.

4. The method according to claim 3, wherein the modification of said mass of air is carried out near the inlets of each of said treatment chambers and in an independent manner in one chamber or the other.

5. The method according to claim 3, wherein the modification of said mass of air comprises the steps of setting, for each of said treatment chambers, a respective temperature, geometry or distribution of said respective drying air flow.

6. The method according to claim 1 creating within each of said treatment chambers a vortical mixing motion of said mass of cores by creating at least one obstacle in each of said chambers.

7. The method according to claim 1, further comprising a helically wound body stably connected to the at least one hollow drum to define the plurality of internal treatment chambers.

8. A method for the continuous coating of cores of confectionery products, the method comprising:
   providing a coating machine comprising at least one hollow drum rotating about a hinge axis thereof and having a plurality of internal treatment chambers communicating one with the other and adapted to each house a respective mass of cores to be treated;
   feeding the mass of cores to be treated and at least one coating material in one of said treatment chambers; and
   coating said cores with said coating material by handling them within said treatment chamber, wherein the handling of said cores within said treatment chamber comprises a step of angularly and cyclically oscillating said drum in opposite directions about said hinge axis maintaining the mass to be treated in said treatment chamber;
   wherein during said cyclic oscillation, said drum is rotated in one direction or in the other direction about said hinge axis by an angle of substantially one hundred and eighty degrees.

9. A method for the continuous coating of cores of confectionery products, the method comprising:
   providing a coating machine comprising at least one hollow drum rotating about a hinge axis thereof and having a plurality of internal treatment chambers communicating one with the other and adapted to each house a respective mass of cores to be treated;
   feeding the mass of cores to be treated and at least one coating material in one of said treatment chambers;
   coating said cores with said coating material by handling them within said treatment chamber, wherein the handling of said cores within said treatment chamber comprises a step of angularly and cyclically oscillating said drum in opposite directions about said hinge axis maintaining the mass to be treated in said treatment chamber; and
   creating within each of said treatment chambers a vortical mixing motion of said mass of cores by creating at least one obstacle in each of said chambers;
   wherein said vortical motion varies in each of said treatment chambers; the variation of said vortical motion in one of said treatment chambers being carried out in an independent manner from the variation in the other treatment chambers.

10. The method according to claim 9, wherein said vertical motion is varied by varying the position of at least one ploughshare arranged within each of said treatment chambers and oscillating about said hinge axis together with said drum.

11. A method for the continuous coating of cores of confectionery products, the method comprising:
    providing a coating machine comprising at least one hollow drum rotating about a hinge axis thereof and having a plurality of internal treatment chambers communicating one with the other and adapted to each house a respective mass of cores to be treated;
    feeding the mass of cores to be treated and at least one coating material in one of said chambers; and
    coating said cores with said coating material by handling them within said treatment chamber, wherein the handling of said cores within said treatment chamber comprises a step of angularly and cyclically oscillating said drum in opposite directions about said hinge axis maintaining the mass to be treated in said treatment chamber;
    wherein said drum rotates in only one rotation direction at the end of said step of angularly and cyclically oscillating until the mass of cores treated in said treatment chamber is taken in an adjacent treatment chamber.

\* \* \* \* \*